US011368749B2

(12) United States Patent
Nagorniak et al.

(10) Patent No.: US 11,368,749 B2
(45) Date of Patent: Jun. 21, 2022

(54) SUBSTITUTING ALTERNATIVE MEDIA FOR PRESENTATION DURING VARIABLE SPEED OPERATION

(71) Applicants: AT&T Intellectual Property I, L.P., Atlanta, GA (US); AT&T Mobility II LLC, Atlanta, GA (US)

(72) Inventors: David Nagorniak, Chapin, SC (US); Adam Gasper, Roswell, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 49 days.

(21) Appl. No.: 16/778,129

(22) Filed: Jan. 31, 2020

(65) Prior Publication Data
US 2020/0169784 A1 May 28, 2020

Related U.S. Application Data

(63) Continuation of application No. 16/136,923, filed on Sep. 20, 2018, now Pat. No. 10,587,915, which is a continuation of application No. 15/666,632, filed on Aug. 2, 2017, now Pat. No. 10,110,949, which is a continuation of application No. 13/679,802, filed on Nov. 16, 2012, now Pat. No. 9,762,955.

(51) Int. Cl.
H04N 21/44 (2011.01)
H04N 21/81 (2011.01)

(52) U.S. Cl.
CPC . *H04N 21/44008* (2013.01); *H04N 21/44016* (2013.01); *H04N 21/812* (2013.01); *H05K 999/99* (2013.01)

(58) Field of Classification Search
CPC ..... H04N 21/44008; H04N 21/440196; H04N 21/812; H04N 21/44016; H05K 999/99
See application file for complete search history.

(56) References Cited

U.S. PATENT DOCUMENTS

| | | | |
|---|---|---|---|
| 5,424,770 A | 6/1995 | Schmelzer et al. | |
| 5,719,634 A | 2/1998 | Keery et al. | |
| 6,347,114 B1 | 2/2002 | Blanchard | |
| 7,010,685 B1 | 3/2006 | Candelore et al. | |
| 7,849,487 B1 * | 12/2010 | Vosseller | H04N 21/23439 725/88 |
| 8,752,087 B2 | 6/2014 | Begeja et al. | |
| 9,762,955 B2 | 9/2017 | Nagorniak et al. | |
| 10,110,949 B2 | 10/2018 | Nagorniak et al. | |

(Continued)

Primary Examiner — Anthony Bantamoi
(74) Attorney, Agent, or Firm — Guntin & Gust, PLC; Jay Anderson

(57) ABSTRACT

A process that incorporates teachings of the subject disclosure may include, for example, detecting a video cue frame within the multimedia data. The video cue frame has an image portion including alternative multimedia content and an encoded message, wherein the alternative multimedia content is imperceptible at a display device during a normal display rate presentation. The alternative multimedia content is obtained from the video cue frame responsive to receiving a first selection of a first alternative display rate that differs from the normal display rate. The alternative multimedia content is provided for display at a display device based on the encoded message. Other embodiments are disclosed.

20 Claims, 8 Drawing Sheets

(56) References Cited

U.S. PATENT DOCUMENTS

| | | |
|---|---|---|
| 2002/0144262 A1 | 10/2002 | Plotnick et al. |
| 2003/0039465 A1 | 2/2003 | Bjorgan et al. |
| 2003/0110516 A1* | 6/2003 | Chang .............. H04N 21/23892 725/136 |
| 2003/0174837 A1 | 9/2003 | Candelore et al. |
| 2004/0103429 A1 | 5/2004 | Carlucci et al. |
| 2005/0207731 A1 | 9/2005 | Unger et al. |
| 2006/0075449 A1 | 4/2006 | Jagadeesan et al. |
| 2008/0090513 A1 | 4/2008 | Collins et al. |
| 2008/0163289 A1 | 7/2008 | Keys |
| 2008/0235087 A1 | 9/2008 | Amento et al. |
| 2008/0273698 A1 | 11/2008 | Manders et al. |
| 2009/0150930 A1 | 6/2009 | Sherwin et al. |
| 2010/0107189 A1 | 4/2010 | Steelberg et al. |
| 2010/0119206 A1 | 5/2010 | Craner et al. |
| 2010/0166389 A1 | 7/2010 | Knee et al. |
| 2010/0172626 A1 | 7/2010 | Lee et al. |
| 2010/0299715 A1 | 11/2010 | Slothouber et al. |
| 2011/0078753 A1 | 3/2011 | Christianson et al. |
| 2011/0142417 A1 | 6/2011 | Wilson et al. |
| 2011/0208829 A1 | 8/2011 | Kwon et al. |
| 2011/0219400 A1 | 9/2011 | Candelore et al. |
| 2011/0219401 A1* | 9/2011 | Candelore ............ H04N 5/445 725/34 |
| 2011/0243533 A1 | 10/2011 | Stern et al. |
| 2012/0105875 A1 | 5/2012 | Chinnici et al. |
| 2012/0167132 A1 | 6/2012 | Mathews et al. |
| 2013/0031266 A1* | 1/2013 | Gilson ................... G06F 15/16 |
| 2013/0347018 A1* | 12/2013 | Limp ................ H04N 21/4394 725/19 |
| 2017/0041649 A1* | 2/2017 | Dalrymple ........... H04N 21/812 |
| 2017/0339456 A1 | 11/2017 | Nagorniak |
| 2019/0020919 A1 | 1/2019 | Nagorniak et al. |

* cited by examiner

150

200

SUBSTITUTING ALTERNATIVE MEDIA FOR PRESENTATION DURING VARIABLE SPEED OPERATION

CROSS REFERENCE TO RELATED APPLICATIONS

This application is a continuation of U.S. application Ser. No. 16/136,923, filed on Sep. 20, 2018, which is a continuation of U.S. application Ser. No. 15/666,632, filed on Aug. 2, 2017 (now U.S. Pat. No. 10,110,949), which is a continuation of U.S. application Ser. No. 13/679,802, filed on Nov. 16, 2012 (now U.S. Pat. No. 9,762,955), which are incorporated herein by reference in their entirety.

FIELD OF THE DISCLOSURE

The subject disclosure relates to substituting alternative media for presentation during variable speed operation.

BACKGROUND

Multimedia, such as broadcast television and video on demand, typically include some form of promotional messages, such as commercial messages or advertisements. For the benefit of viewers, production and distribution costs of multimedia are offset by advertising revenues gained through sale of promotional spots. Advertisers may purchase promotional spots for airing promotional messages during a particular program, time and/or market, with an expectation that viewers will be exposed to their products and services by way of their messages.

Multimedia recorders, such as digital video recorders (DVR) and video cassette recorders (VCR), generally record multimedia without distinguishing differences between programmed content, such as movies or broadcast television shows, versus promotional spots positioned within the programmed content. A viewer may select from an electronic program guide one or more programs for recording. Alternatively, a viewer may select one or more of a start time, an end time, duration, and channel for recording. Multimedia program content airing in association with the viewer-selected programs or at the viewer-selected channels and times may be subsequently recorded. The recorded multimedia programs generally include any promotional content, such as original advertisements that aired during promotional spots of the recorded program. Consequently, the original advertisements will be viewable during playback of the pre-recorded multimedia content.

BRIEF DESCRIPTION OF THE DRAWINGS

Reference will now be made to the accompanying drawings, which are not necessarily drawn to scale, and wherein.

DETAILED DESCRIPTION

Figure 1A:
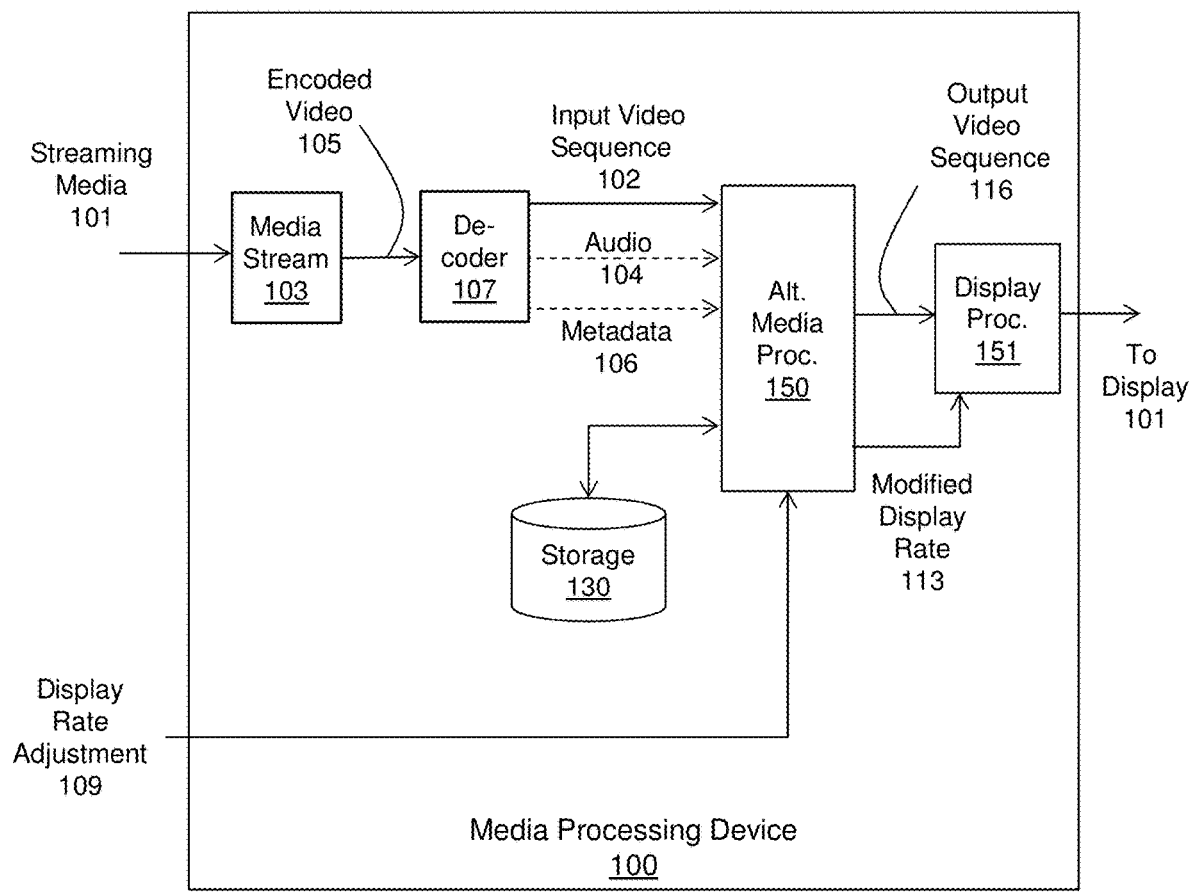
FIG. 1A depicts an illustrative embodiment of a media processing device including an alternative media selector.

The subject disclosure describes, among other things, illustrative embodiments of techniques related to selecting and substituting alternative media for presentation during variable display rate operation of a multimedia processor, such as a set-top box or a digital video recorder. Examples include the selection and presentation of an alternative video sequence for display during periods of fast forwarding or rewinding. Whereas multimedia content produced for normal display rate consumption may be unintelligible when displayed during periods of fast forwarding or rewinding, alternative media can be configured to deliver an intelligible message during such periods of operation. Other embodiments are included in the subject disclosure.

One embodiment of the subject disclosure includes an apparatus having a memory to store computer instructions and a processor coupled to the memory. The processor, responsive to executing the computer instructions, performs operations including receiving video data including program content and promotional content and forwarding the video data to a display device. A video cue is detected within the video data, wherein the video cue is imperceptible during a first display rate presentation of the video data. A selection is received for a second display rate that differs from normal display rate. Alternative video content is selected and forwarded to the display device responsive to the video cue and the selection for second display rate that differs from normal display rate.

Another embodiment of the subject disclosure includes a processor including receiving, by a system including a processor, video data including program content and promotional content. The video data are forwarding, by a system, to a display device. A video cue is detected by the system within the video data, wherein the video cue is imperceptible during a normal display rate presentation of the video data. A selection is received for alternative display rate that differs from normal display rate. Alternative content is forwarded by the system to the display device responsive to the video cue and the selection for alternative display rate that differs from normal display rate.

Yet another embodiment of the subject disclosure includes a computer-readable storage medium, including computer instructions which, responsive to being executed by a processor, cause the processor to perform operations. The performed operations include receiving multimedia data including program content and promotional content and forwarding multimedia data to a multimedia presentation device. A video cue is detected within the multimedia data, wherein the video cue is imperceptible during normal display rate presentation of the multimedia data. A selection is received for alternative display rate that differs from normal display rate. Alternative content is forwarded to the display device responsive to the video cue and the selection for alternative display rate that differs from normal display rate.

FIG. 1A depicts and illustrative embodiment of a media processing device 100, such as a set-top box, a digital video recorder, a computer, a tablet computer, a personal data assistant, a smart phone, and the like. The media processing device 100 includes a media streaming module 103, a media decoding module 107, an alternative media processor 150, a display processing module 151 and in at least some embodiments, a storage device 130. In operation, the media processing device 100 receives a media 101 in the form of streaming media, processing the received streaming media and provides an output suitable for presentation to a display device for displaying content of the received streaming media. The media processing device 100 receives a alternative display rate 109 input causing the display processing module 151 to adjust presentation of the media, for example, in the form of play, pause, fast-forward, rewind, and the like, according to a user selection.

The media streaming module 103 receives streaming media, such as streaming video, streaming audio, streaming text, and combinations thereof, sometimes referred to as streaming multimedia (e.g., streaming audiovisual content as in the context of a movie or broadcast television program). The media streaming module 103 can include a media streaming client process to suitably process the received streaming media according to a streaming media protocol applied by a streaming media source, such as a video server, a broadcaster, etc. The received media can include compression, for example, as in MPEG compression applied to audiovisual content. The decoder 107 module receives a compressed presentation of the received media, applies a suitable decompression algorithm, and provides as an output a decompressed presentation of the received media.

In the illustrative example, output of the decoder module includes a video sequence 102, an audio portion 104 and metadata 106. The video 102, audio 104 and metadata are forwarded to the alternative media processor 150, along with a signal or other suitable indication as to the received display rate selection 109. The multimedia processor 150 can selectively insert substitute media content into at least the video sequence 102, for example, during periods of fast-forward, rewind, pause, such that a modified video sequence 116 is forwarded to the display processor 151. The display processor generates a suitable input for presentation to a display device, representative of the modified video sequence.

Figure 1B:
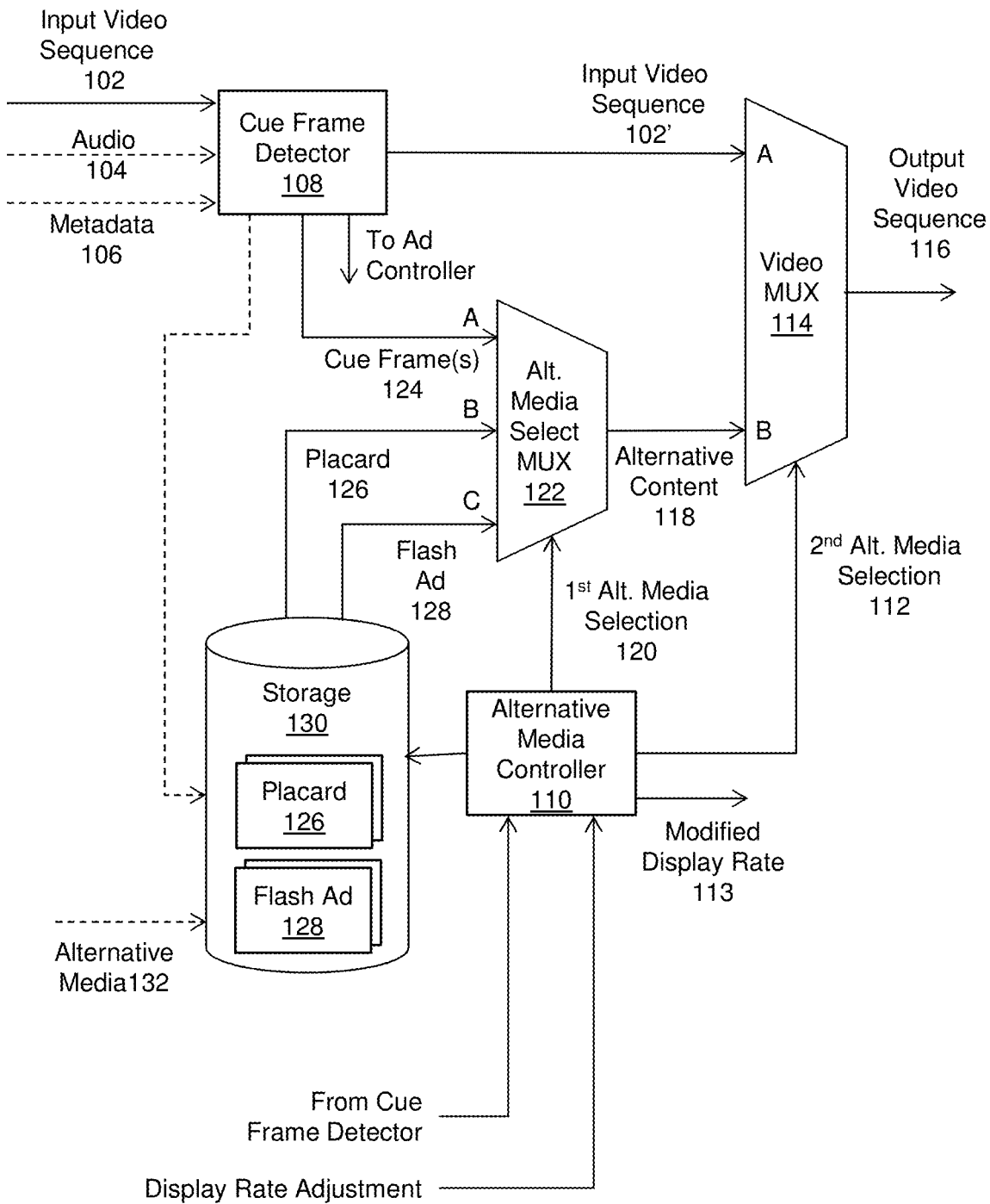
FIG. 1B depicts in more detail an illustrative embodiment of the alternative media selector of FIG. 1A.

FIG. 1B depicts an illustrative embodiment of an alternative media processor 150. The alternative media processor 150 receives an input media stream, such as an input video sequence 102 and provides an output media stream, such as an output video sequence 116. The alternative media processor 150 also includes a cue frame detector 108, an alternative media controller 110, a content delivery multiplexor 114 and an alternative media selection multiplexor 122. The cue frame detector 108 receives the input video sequence 102. In at least some embodiments, the cue frame detector can also receive one or more of an associated audio track 104 and metadata 106. For example, the video sequence 102, the audio track 104 and the metadata 106 can be provided from a video decompression module (not shown), such as an MPEG decoder. The cue frame detector 108 can forward the video sequence 102' to a first input A of the video multiplexer 114. The forwarded video sequence 102' can be the same video sequence received by the cue frame detector 108, or a modified version, for example, having one or more of the cue frames 124 removed or modified within the input video sequence 102.

The cue frame detector 108 can be configured to detect one or more cue frames 124 included within the input video sequence 102. As disclosed herein, a cue frame 124 can provide an indication of alternative video content to be displayed during variable display rate operation. A cue frame 124 can include the alternative content, as in a placard image to be displayed as a billboard during periods of variable display rate operation. A series of cue frames 124 can collectively include the alternative content, as identical images, collectively displaying a billboard, or as different images collectively forming an intelligible moving image when displayed during variable display rate operation.

Generally, cue frames 124 do not contribute to a human interpretable display of the video sequence 102 within which they are embedded when viewed at normal display rate, e.g., non-variable display rate mode. At least one approach for ensuring this result includes the introduction of only a single cue frame 124 or a small group of cue frames bounded by extended segments of program content video frames. For example, an isolated, single cue frame 124 in a video sequence 102 when displayed at a normal playback rate of about 30 frames per second would be unintelligible by a human observer and thus imperceptible during normal display rate presentation of video data. Nevertheless, the cue frame detector 108 is configured to identify such cue frames 124 as they occur within the input video sequence 102.

In some embodiments, candidate cue frames 124 can be detected as individual frames, or small groups of frames, that differ substantially from neighboring frames. A sudden change from one video frame to the next might be an indication of a scene change within a program, or transition to a different program. As such, video frames immediately subsequent to a scene change or program change would not vary as much as they would be part of the same scene or program. Cue frames 124, however, would appear as a scene/program change followed by another scene/program change within the order of $\frac{1}{30}^{th}$ of a second or similarly short duration. Such a brief duration would be too brief for two scene changes, suggesting that the apparently out of place frame, or small group of frames, is likely a cue frame 124.

Alternatively or in addition, such cue frames can include a pixel array, such as a sub-image, or region of the image of the cue frame that includes an encoded message, such as a bar code, or quick response (QR) code. Such encoded messages can serve as an indication of a cue frame and in some instances include additional information, such as whether the frame is a placard, or part of a video message. Other information may relate to identification of an advertising sponsor, or address by which alternative content can be associated. In at least some embodiments, one or more of the audio track 104 or the metadata 106 can include indications as to a location of a cue frame, or other information related to the cue frame, such as identification an advertising sponsor, or address by which alternative content can be associated. Such indications can be included as sub-audio signals in the audio track 104, or other suitable means for conveying information.

The cue frames 124 can be inserted at various locations within a video sequence and as such cam be used as signals to identify particular locations within the input video sequence 102. The cue frame detector 108 provides an output signal to the alternative media controller 110 to provide indications when cue frames are identified within the input video sequence 102. Such indications can include a time reference, such as real time value (e.g., coordinated universal time, local time, or some variant), or program time value, e.g., a time relative to a program reference, such as a program start time. In some embodiments, a frame reference includes a frame number, such as a frame number relative to a start of a program, program segment, or the like. In at least some embodiments, the cue frame detector 108 sends a copy of the detected cue frame to the alternative media controller 110. The cue frame can 124 be copied from the input video sequence 102. Alternatively, the cue frame 124 can be extracted from the input video sequence, in which instance the video sequence 102' forwarded to the video multiplexer is a modified video sequence, having the cue frames 124 removed.

In some embodiments, one or more cue frames 124 detected from the input video sequence 102 are stored in a computer-readable storage device 130. In the illustrative embodiment, a dashed line indicates that detected cue frames can be copied to the storage device 130. It is understood that the process of copying such cue frames to the storage device 130 can be accomplished with the assistance of another processor or controller. For example, the alternative media controller 110 or another processor of a media processor can be used to implement one or more features of the alternative media selector.

Alternative media 132 can be obtained by the alternative media processor 150 from one or more sources. Sources include the input video sequence 102, for example, by way of the cue frames 124 or similar video frames inserted within the input video sequence 102. One requirement for this approach would be that the inserted frames are imperceptible when the video sequence 102 is viewed at normal play display rate. Other sources include a network accessible content source, for example, a server or database reachable over the Internet and identified by an address, such as a uniform resource locator (URL). Such addresses and or file names or labels identifying particular alternative content can be included, for example, within the cue frame 124, within the corresponding audio track 104, or within the metadata 106. Thus, detection of a cue frame 124 can be interpreted by the alternative media controller 110 to extract an identity and/or location of alternative media content. The alternative media controller 110 can then obtain the identified alternative media content from the storage device 130, or from a remote source, then storing it locally in the storage device 130 and/or providing it directly to an input of the alternative media select multiplexer 122.

Still other sources for alternative content include other program channels. Thus, a recording of multimedia data including the input video sequence 102 can be obtained from content provided on one channel, while alternative medial suitable for substitution can be obtained on another channel. Alternative media can be obtained or otherwise recorded substantially simultaneously with the program being recorded and/or viewed, for example, on a multi-channel DVR. In some embodiments, alternative content is downloaded in substantially real time for just-in-time delivery for substitution. Alternative content can also be downloaded during periods of inactivity, or during periods of normal program viewing, e.g., preceding a promotional segment, such that the alternative content is stored and available for substitution without fear of interruption due to network delay.

The computer-readable storage device 130 can be any storage device suitable for storing multimedia information. Examples include, without limitation, any of the storage technologies disclosed herein, including storage intended for storing multimedia, such as flash memory, magnetic disks, optical storage disk, and the like. Alternatively or in addition, the electronic storage device 130 can store one or more segments of alternative media for display during display rate operation of the multimedia processor. One category of alternative media includes still images, referred to herein as placards 126. A placard 126 can be displayed by providing a still image, such as a billboard, during periods of fast forward or rewind. Billboard messages can be intelligible regardless of a direction of the display rate processing, e.g., forward or reverse, and regardless of a rate of the display rate processing. The still image can be provided as a sequence of video frames all including substantially the same content, such that when presented to a video port of the display device, produce a substantially still image on the display. Other embodiments can provide a single video frame or image, such as a JPEG or bitmap image to a data port of the display device, which can be displayed as a still image. Another category of alternative media includes a shortened or abridged video message that are intelligible during periods of fast forward operation. Such shortened video messages are referred to herein as "flash" messages, flash commercials, or flash ads 128.

The alternative media processor 110 receives an indication from the cue frame detector 108 and an indication of a display rate selection. The alternative media processor 110 provides a first alternative media selection output 120 to the alternative media selector multiplexor 122. In the illustrative example, the alternative media selector multiplexor 122 receives three inputs: (A) a flash ad 128 from the storage device 130; (B) a placard 126, also from the storage device 130, and (C) a cue frame 124 from the cue frame detector 108. Depending upon an alternative media selection signal 120 provided at a control input of the multiplexor 122, one of the three inputs A, B or C is forwarded to a second input (B) of the content delivery multiplexor 114, as a possible candidate for substitution with the video sequence 102'. The alternative media controller 110 provides a second alternative media selection output signal 112 to the content delivery multiplexor 114. Depending upon a value of the second alternative media selection output signal 112, one of the input video sequence 102' and the alternative content 118 is provided as an output video sequence 116, for example, suitable for forwarding to a video input of a display device (not shown).

In some embodiments, a selection from among more than one available alternative media segments can be made by the alternative media controller. Such selections can be made at least in part responsive to a particular display rate adjust mode of operation. For example, if a display rate selection is for rewind, then a billboard type alternative media can be selected. Similarly, if a fast forward display rate as determined by the display rate selection is above some threshold value, a billboard type advertisement can also be selected. If, however, the display rate selection is below the threshold value, then flash style content can be provided.

One or more elements of the alternative media processor 150 can be implemented within a media processing device, such as a set-top box, a digital video recorder, a computer, a tablet computer, a personal data assistant, a smart phone, and the like.

Figure 2:
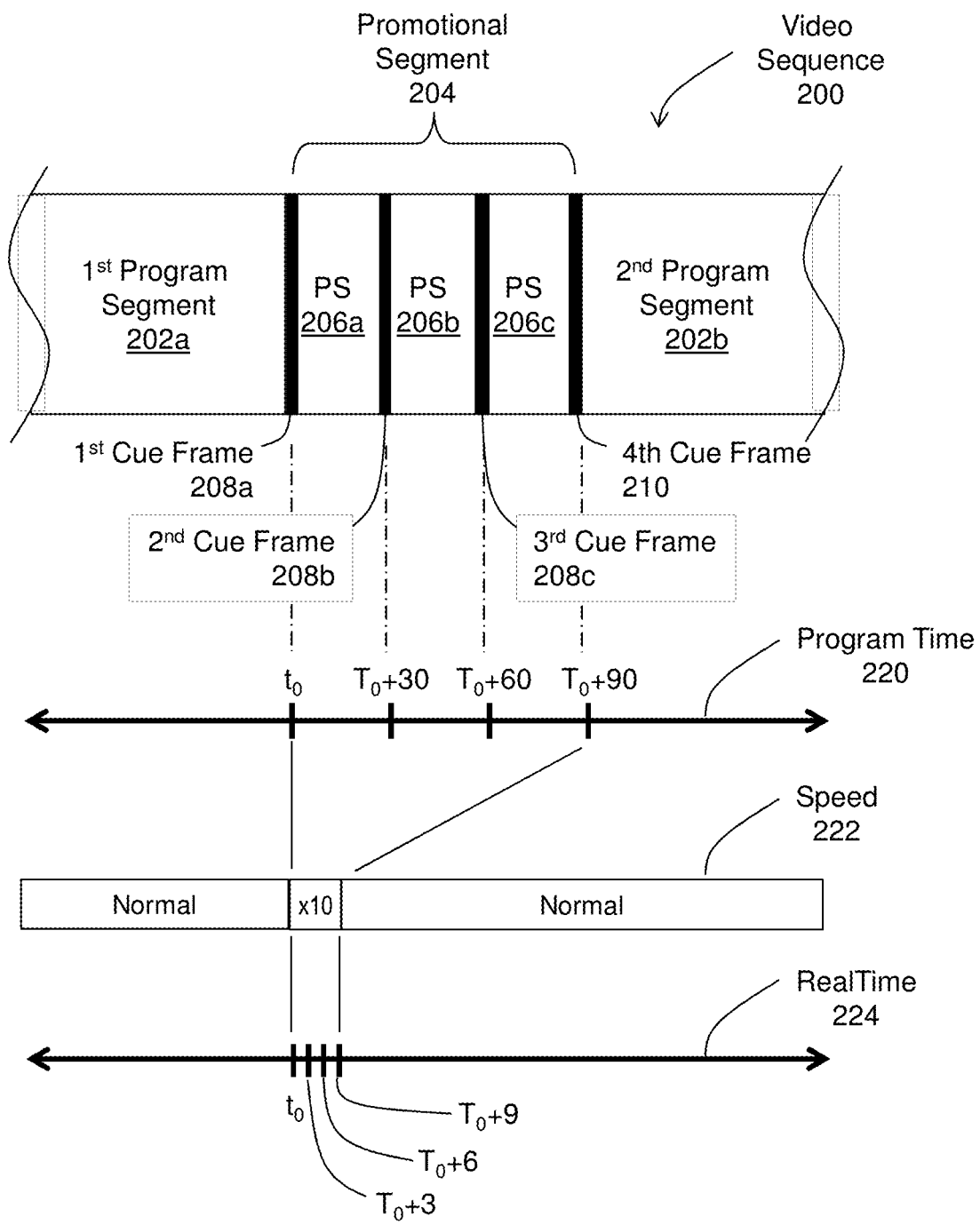
FIG. 2 depicts an illustrative embodiment of multimedia data including video cues for processing by the alternative media selector of FIGS. 1A-1B.

FIG. 2 depicts, in schematic form, an illustrative embodiment of a video sequence 200. The video sequence 200 includes a first program segment 202a including video frames that collectively define a first segment of a video or multimedia program, such as a broadcast television program, video on demand, or pre-recorded content. The video sequence 200 also includes a similar second program segment 202b separated from the first program segment 202a by an intervening promotional segment 204. The promotional segment 204 can represent a commercial break in a multimedia event, such as a television program, sporting event, or the like.

In the illustrative embodiment, the promotional segment 204 includes a first promotional spot (PS) 206a, a second promotional spot 206b and a third promotional spot 206c. A first reference time scale is illustrated below the video sequence 200 and labeled program time 220. A first time reference portrayed on the program time 200 at to identifies a beginning of the promotional segment 204 and a beginning of the first promotional spot 206a. A second time reference at $t_0+30$ identifies a beginning of the second promotional spot 206b. A third time reference at $t_0+60$ identifies a beginning of the third promotional spot 206c, and a fourth time reference at $t_0+60$ identifies an end of the of the third promotional spot 206b and the end of the promotional segment 204. For example, each of the promotional spots 206a, 206b, 206c (generally 206) corresponds to a 30 second promotional spot, collectively occupying 90 seconds on the program timeline 220. Commercial messages including respective video segments of commercial content can be included within each of the respective promotional spots 206, such that the commercial content will be displayed during presentation of the video sequence 200 on a display device.

A playback mode or playback display rate indicator 222 is illustrated below the program timeline 220. A leftmost segment of the playback display rate indicator 222 is labeled "Normal" indicating that normal display rate has been chosen by equipment of a user allowing for standard display rate playback prior to time $t_0$. At time $t_0$, however, the playback display rate is varied by equipment of a user to a value of ten times (10×) faster than normal playback display rate. The fast forward display rate occurs only for the duration of the promotional segment 204, and then returns to normal display rate playback for the second program segment 202b. A second timeline is illustrated below the playback mode/display rate indicator 222, indicative of real or otherwise perceived time 224 in view of the different playback display rates. As a display rate selection is made to increase playback display rate by a factor of ten (10×) during the first promotional slot 206a, the duration of 30 seconds is reduced by a factor of ten, resulting in a perceived duration of three seconds. Similar time compression is perceived for the second and third promotional spots 206, such that the duration of the entire promotional segment 204 is reduced from 90 seconds to only nine seconds.

The techniques disclosed herein provide opportunities for selecting and/or inserting substitute multimedia, e.g., video, content during periods of display rate selection, such that a first substitute promotional message can be forwarded to a display device for the perceived time of the first promotional spot, e.g., for three seconds, instead of the original 30 second promotional spot. In some embodiments, different substitute promotional messages are displayed with respect to each promotional spot. In the illustrative example, fast forwarding through three 30-second promotional spots 260 would result in three successive substitute promotional messages, of about three seconds each. Alternatively or in addition, it is possible for one alternative video content to be substituted and forwarded to the display device for the entire promotional segment 204, or for the entire duration that display rate adjust operates at a non-normal display rate.

In the illustrative example, each of the first, second and third promotional messages 206a, 206b, 206c is preceded by a respective one of first, second and third cue frames 208a, 208b, 208c (generally 208). Although the cue frame 208 is shown as a first frame in a promotional spot 206, it is possible for the cue frame 208 to appear anywhere within the promotional spot 206 or at other locations within the video sequence, including any location within the promotional segment 204 and in the program segment 202, for example, at a location preceding the promotional segment 204.

In a similar manner that a cue frame 208 can be included to indicate an opportunity for alternative promotional media content, a similar cue frame 208 can be included to indicate a conclusion of a promotional segment 204. For example, a cue frame 208 providing a placard or flash message indicative of the original program content can be included at an end of a promotional segment 204. Such a placard can include a program title, a promotional scene, or excerpt from the program or program segment 202. For example, while alternative promotional content can be forwarded to a display during variable display rate operation within segments of original promotional content, alternative program content indicative of the original program can be forwarded to the display during variable display rate operation within segments of the original program. This allows a viewer to observe alternative promotional messages while fast forwarding or rewinding through promotional segments, while also receiving an indication that the promotional segment has passed, allowing a user to return to normal display rate operation, should that be so desired.

Figure 3:
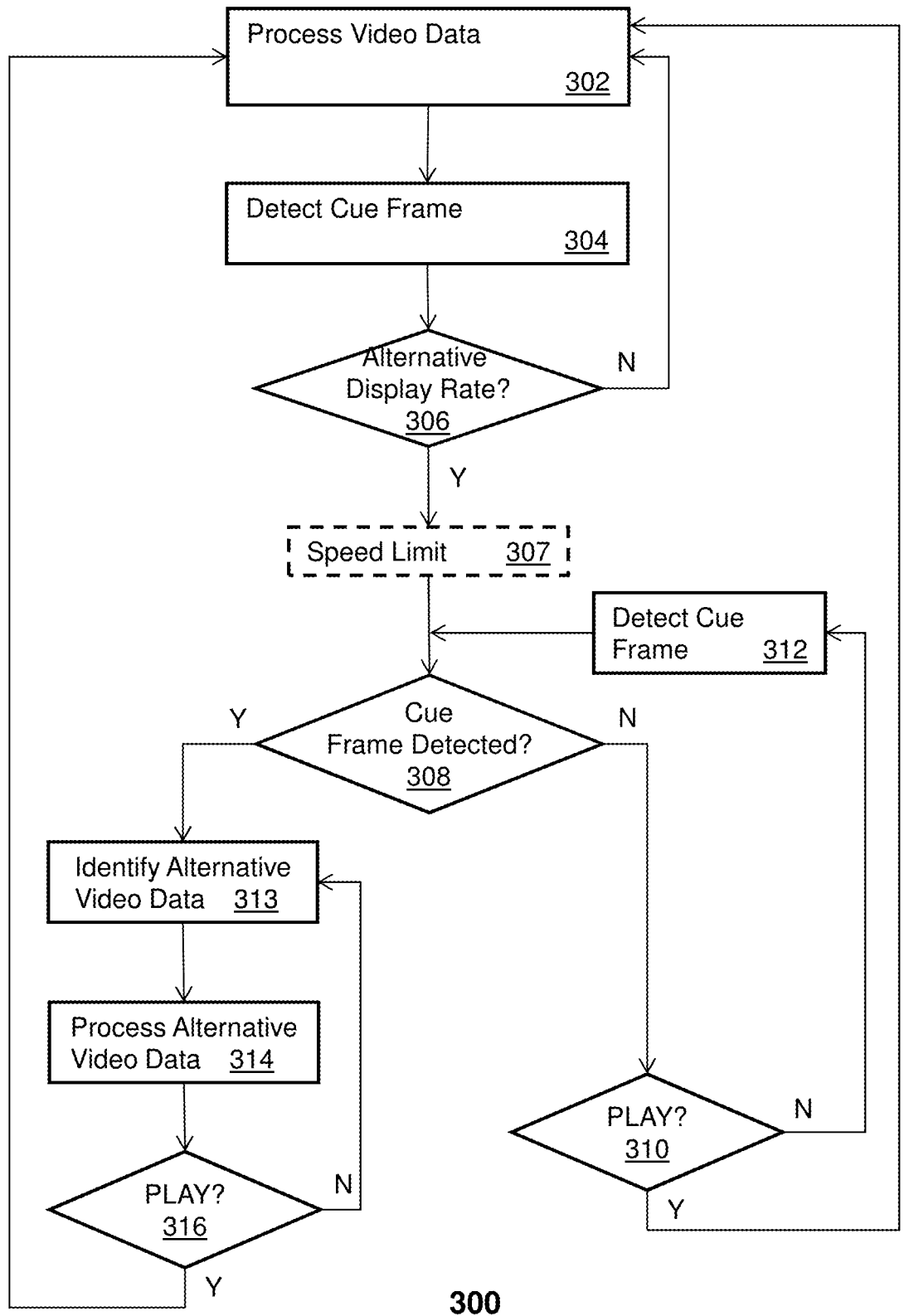
FIG. 3 depicts an illustrative embodiment of a process operating in portions of the system described in FIGS. 1A-1B and FIGS. 4-7.

FIG. 3 depicts an illustrative embodiment of a process 300 for substituting alternative media for display during periods of variable display rate operation. Video data is processed at 302. This can include, for example, receiving a multimedia stream 102 (FIG. 1) including a sequence of video frames, otherwise referred to as a video sequence 200 (FIG. 2). Processing of the video data can include forwarding the multimedia stream including the video sequence to a display device for presentation to a viewer.

The video sequence 102, 200 can be forwarded to the display device at various display rates. For example, normal display rate referring to playback display rate at an intended display rate in which each one minute segment of a video sequence forwarded to the display device is displayed in about a one minute period. Other display rate selections include fast forward, slow motion, rewind, and pause. In at least some of the display rate selections, such as fast forward, one or more fast forward display rates can be selected by equipment of a viewer. Examples of different fast forward display rates include twice (2×) normal display rate, in which each one minute segment of video sequence forwarded to the display device is displayed in about 30 seconds. Other fast forward display rates include ten times (10×), in which each one minute segment of video sequence forwarded to the display device is displayed in about six seconds. Other fast forward display rates include even greater display rates, such as twenty times (20×) normal display rate and thirty two times (32×) normal display rate.

A cue frame 208 within the video sequence 200 is detected at 204. Continuing with the illustrative example of FIG. 1, the cue frame detector 108 receives the input video sequence 102 and detects cue frames 124 embedded within the input video sequence. In general, such cue frames 124 can be embedded during production of the video sequence or at any time during distribution and presentation of the video sequence, allowing different entities to direct later substitution of alternative media.

It can be determined at 306 whether processing of the video data is subject to an alternative display rate selection. In this context, an alternative display rate selection refers to a display rate presentation other than normal playback display presentation. Such detection of an alternative display rate selection can be accomplished by the alternative media controller 110. For example, the alternative media controller 110 can receive an indication from a display rate selection 109, as may be provided from an operational mode selection (e.g., fast forward 2×, fast forward 10×, rewind) of a multimedia processor associated with the input video sequence 102. To the extent that it is determined at 306 that there is no alternative display rate, signifying normal display rate, or playback operation, the process continues with the processing of video data at 302. To the extent, however, that it is determined at 306 that there is an alternative display rate, it is next determined at 308 whether a cue frame has been detected.

The alternative media controller 110 receives an indication from the cue frame detector 108 that a cue frame 124 has been detected. To the extent that it is determined at 308 that a cue frame has been detected, alternative video data is identified at 313. For example, the alternative media controller 110 can select one or more alternative media segments from the storage device 130. In some embodiments, selection of a particular alternative media segment can be responsive to information obtained from the cue frame 124. For example, the alternative media content can be a placard 126 corresponding to the cue frame 124 itself.

Identification or selection of the alternative media content can include providing the selected alternative content to an alternative content input of the video multiplexor 114. Continuing with the illustrative example of FIG. 1, the alternative media controller 110 after having selected alternative media for presentation to the alternative media selection multiplexor 122, selects a corresponding input by way of the first alternative media selection control signal 120. Thus, if a particular placard 126 was chosen from the storage device, then the (B) input corresponding to the placard 126 is selected as alternative content 118.

Once identified, the alternative video data is processed at 314. Processing can include the alternative media controller 110 providing a second alternative media selection signal 112 to a control input of the content delivery multiplexer 114. The second alternative media selection signal 112 selects the alternative content 118 as the output video sequence 116. The output video sequence 116, now including the alternative content 118 of the placard 126, is forward to the display device for display to a viewer.

It is next determined at 316 whether the display rate has returned to normal playback display rate. To the extent that it has not, the process continues by identifying any additional alternative video data at 313, processing the alternative video data at 314. To the extent that the display rate has returned to normal playback display rate, the process continues at 302 to process the original video data. This can be accomplished by the alternative media controller 110 receiving an input identifying normal playback display rate, and in response, providing a second alternative media selection signal 112 at the control input of the content delivery multiplexer 114 selecting or otherwise causing the input video sequence 102' to be provided as the output video sequence 116 and forwarded to the display device for display to the viewer.

Considering the alternative at 308 in which it is determined that a cue frame has not been detected, it is next determined at 310 whether the display rate has returned to normal playback display rate. To the extent that it has, the process continues at 302 to process the original video data. To the extent that is has not, another cue frame can be detected at 312, followed by a determination at 308 as to whether another cue frame has been detected. Thus, if no cue frame was originally detected at 304, but an alternative display rate was detected at 306, the process continues to check for cues frames at 312 until either a cue frame is detected at 308 or video processing returns to normal playback mode at 310. If a cue frame is subsequently detected at 308, alternative video data is identified at 313 and processed at 314, as described above.

In at least some embodiments, after determining that a alternative display rate has been applied at 306, a display rate limit is selectively applied at 307. For example, a fast forward can be a relatively slow value, such as two to ten times normal display rate, or a relatively fast value, such as 32 times normal display rate. If a cue frame is detected at 304, alternative video data will be processed at 314, for example, inserted into the displayed video. If the alternative video provides a video clip, the presentation of the video may depend upon the fast forward rate. Namely, for presentation of a short video clip inserted in place of a standard commercial may depend upon the fast forward rate being a particular rate, e.g., 2 times or 10 times, or a relatively slow rate below some threshold presentation rate e.g., below 10 times normal display rate.

Even if a placard style of alternative video is inserted, presenting a still image, the duration of the image display can depend upon the user provided fast forward rate. The duration of a presentation of at a display device of the alternative video data may depend upon the fast forward display rate. A user selection of ten times normal rate will allow up to three seconds for display of a placard in place of a 30 second promotional segment. A selection of 32 times normal display rate may be too fast for even a placard style message.

The display rate limit 307 can operate to detect a user selected display rate and if the user selected display rate is above a threshold display rate, substitute it with a lower display rate. By way of example, the alternative media processor 150 receives a display rate selection input 109 indicating a fast forward display rate of 32 times normal display rate. The alternative media controller 110 determines at 304 that a cue frame has been detected. The alternative media controller 110 compares the received display rate selection to a display rate limit, e.g., ten times normal display rate. Since the selected fast forward display rate of 32 times is above the display rate limit, the alternative media controller 110 provides a modified viewing display rate 113, for example, to the display processor 151 causing the fast forward operation to be limited to a display rate limit, e.g., ten times normal display rate. In some embodiments, application of the display rate limit and/or selection of a particular display rate limit can be pre-programmed to depend upon the nature of the alternative media substituted into the output video sequence 116.

Figure 4:
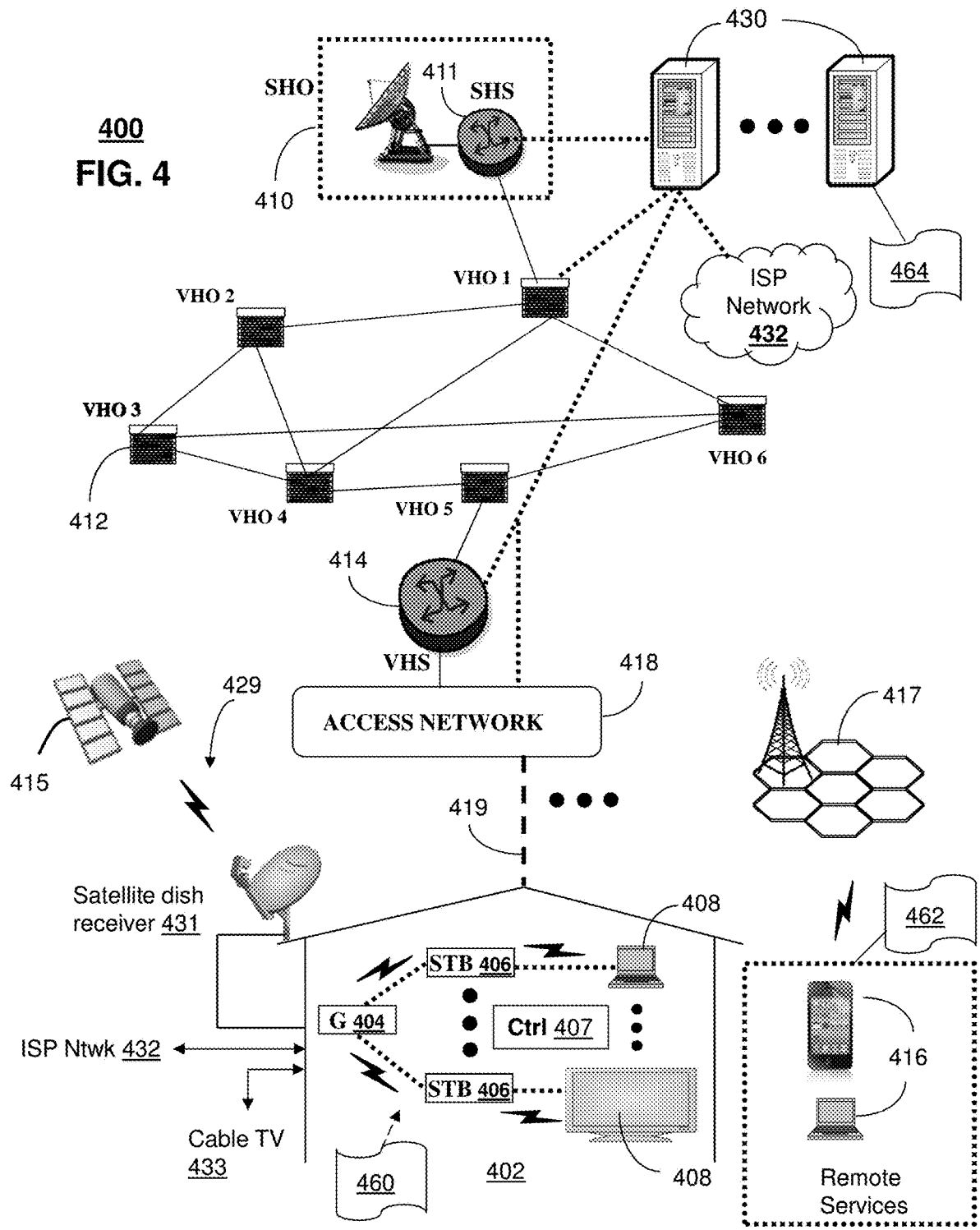
FIGS. 4-5 depict illustrative embodiments of communication systems that provide media services.

FIG. 4 depicts an illustrative embodiment of a first communication system 400 for delivering media content. The communication system 400 can represent an Internet Protocol Television (IPTV) media system. Multimedia content can be disseminated or otherwise distributed by such a system to user display devices. The multimedia content can include video cue frames inserted during production or distribution of the multimedia content. Processing at a multimedia processor, such as a set-top box or digital video recorder can interpret or otherwise identify inserted cue frames and selectively substitute the originally disseminated multimedia content with substitute content during periods of display rate selections from normal playback display rate.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

The communication system 400 can also provide for all or a portion of the computing devices 430 to function as a video cue frame insertion processor or substitute content management processor (herein referred to as an alternative content manager 430). The alternative content manager 430 can use computing and communication technology to perform function 464, which can include among other things, one or more of an ability to locate promotional spots within multimedia data, to insert video cue frames to identify opportunities for substitution of alternative multimedia content, and to generate alternative content suitable for dissemination and substitution during periods of alternative display rate of suitably modified multimedia data. The media processors 406 and wireless communication devices 416 can be provisioned with software functions 460 and 462, respectively, to utilize the services of the alternative content manager 430. Such software functions 460, 462 can implement alternative media selection and or substitution during periods of alternative display rate of multimedia processed by the media processors 406 and the wireless communication devices 416. Such software functions can implement one or more features of FIGS. 1 and 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
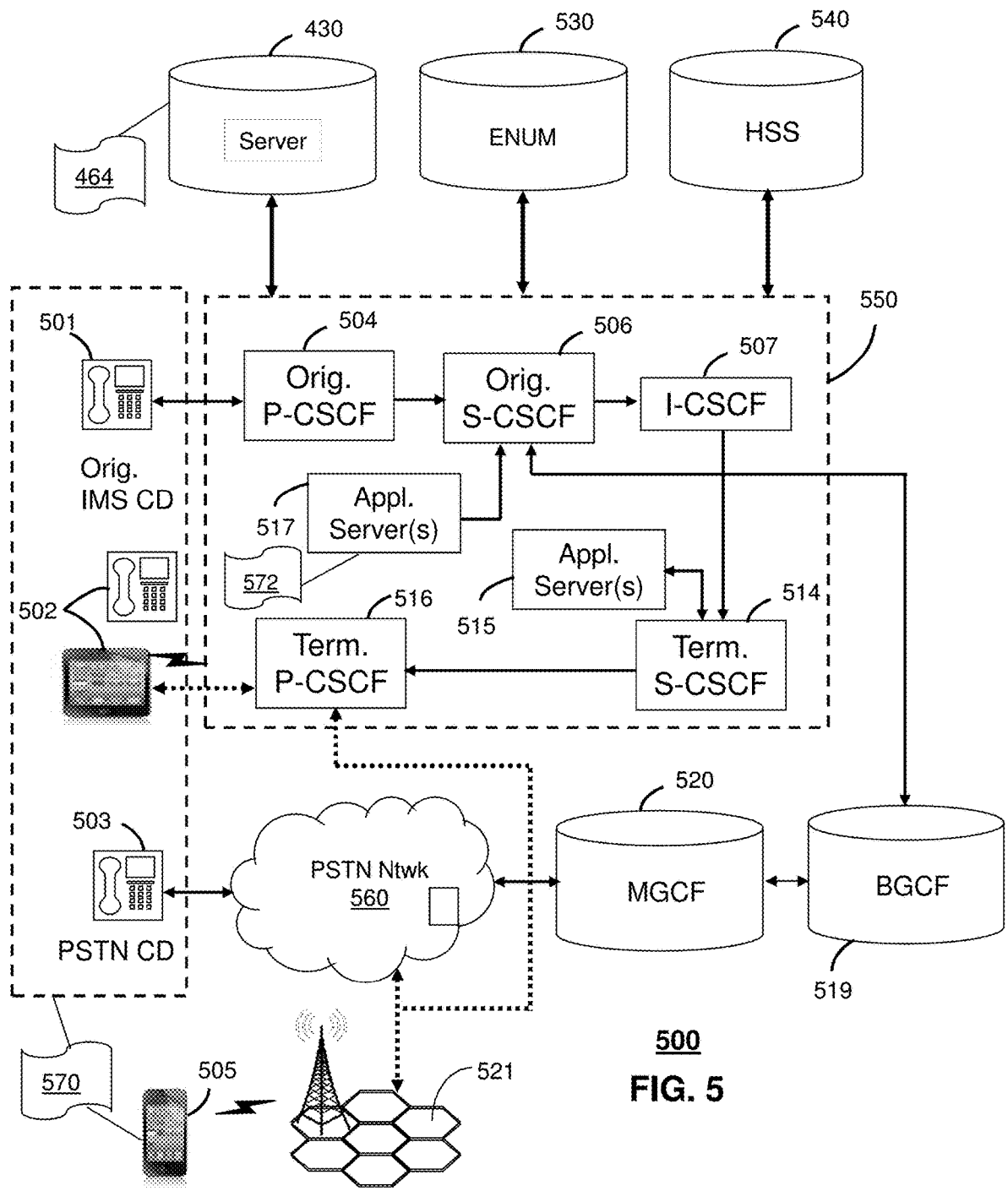

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with communication system 400 as another representative embodiment of communication system 400. Multimedia content can be disseminated or otherwise distributed by such a system to user display devices. The multimedia content can include video cue frames inserted during production or distribution of the multimedia content. Processing at a multimedia processor, such as a set-top box or digital video recorder can interpret or otherwise identify inserted cue frames and selectively substitute the originally disseminated multimedia content with substitute content during periods of alternative display rate, being different from normal display rate during playback operation.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (aSs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The alternative content manager 430 of FIG. 4 can be operably coupled to the second communication system 500 for purposes similar to those described above. The alternative content manager 430 can perform function 464 and thereby provide alternative content services to the CDs 501, 502, 503 and 505 of FIG. 5. CDs 501, 502, 503 and 505, which can be adapted with software to perform function 570 to utilize the services of the alternative content manager 430. The alternative content manager 430 can be an integral part of the application server(s) 517 performing function 572, which can be substantially similar to function 460 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
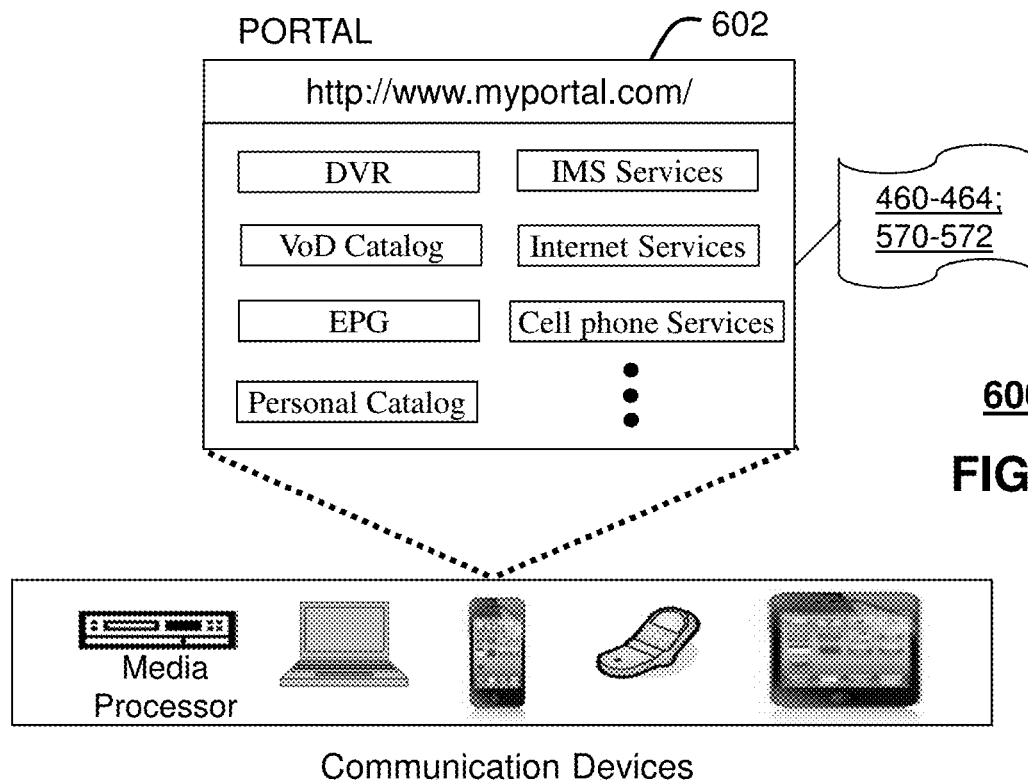
FIG. 6 depicts an illustrative embodiment of a web portal for interacting with the communication systems of FIGS. 1A-1B.

FIG. 6 depicts an illustrative embodiment of a web portal 602 which can be hosted by server applications operating from the computing devices 430 of the communication system 150 illustrated in FIG. 1. Multimedia content can be disseminated or otherwise distributed by such a system to communication devices in communication with display devices. The multimedia content can include video cue frames inserted during production or distribution of the multimedia content. Processing at a multimedia processor, such as a set-top box or digital video recorder can interpret or otherwise identify inserted cue frames and selectively substitute the originally disseminated multimedia content with substitute content during periods of alternative display rates from normal playback display rate. The web portal 602 can be used for managing services of communication systems 400-500. A web page of the web portal 602 can be accessed by a Uniform Resource Locator (URL) with an Internet browser such as Microsoft's Internet Explorer™, Mozilla's Firefox™ Apple's Safari™, or Google's Chrome™ using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 460-464, and 570-2 to adapt these applications as may be desired by subscribers and service providers of communication systems 400-500.

Figure 7:
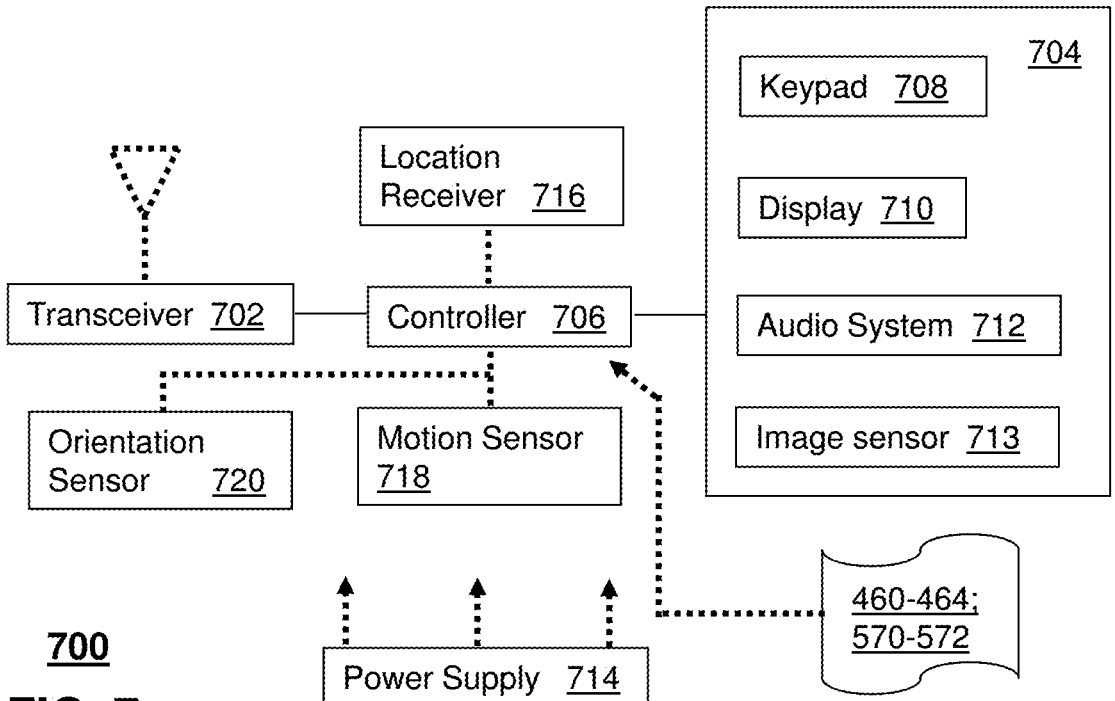
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 4-5. Multimedia content can be received by the communication device 700 including a display 710. The multimedia content can include video cue frames inserted during production or distribution of the multimedia content. Processing at a multimedia processor, for example, implemented within one or more of the transceiver 702, the controller 706 and the display 710, can interpret or otherwise identify inserted cue frames and selectively substitute the originally disseminated multimedia content with substitute content during periods of alternative display rates from normal playback display rate. The communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 400 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of communication systems 400-500. In addition, the controller 706 can be adapted in various embodiments to perform the functions 460-464 and 570-572, respectively.

The techniques disclosed herein offer several advantages including an ability to convey messages to a display device by way of alternative content substituted for program content during periods of alternative display rates, such as fast forward and reverse. The messages can be provided in a manner such that they are intelligible by a viewer of the display device, providing a coherent message despite the display rate selection. Other advantages include an ability to increase revenue from the sale of promotional spots. Namely, the original promotional spot can be sold as is done today for the delivery of a promotional message during normal play. The same promotional spot can be sold to the same entity or to another entity for delivering a similar or different message during periods of viewing display rate adjustment. Thus, a typical 30, 60 or 90 second commercial for a fast food restaurant or soft drink can be substituted with a shortened message, such as a flash version of a commercial for the same promoter suitable for consumption at fast forward, e.g. 10×, or by a billboard message, such as a name, logo, image and so forth related to the particular goods and services being promoted.

Still further advantages, allow for such enhanced sale of alternative content to be distributed from national networks, to local networks, affiliates, providers, and the like. Other advantages include an ability to provide different alternative media content for the same recorded program. Namely, alternative media can be obtained at or near a time of viewing. Thus a pre-recorded program viewed at any time in the future can be accompanied by fresh promotional messages.

Upon reviewing the aforementioned embodiments, it would be evident to an artisan with ordinary skill in the art that said embodiments can be modified, reduced, or enhanced without departing from the scope of the claims described below. For example, the techniques disclosed herein related to the processing of video frames could be applied to audio recordings. Audio cue frames would be provided and used to select and insert alternative audio content during periods of alternative display rate, including fast forward and rewind, delivering a coherent audio message during such periods of operation. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
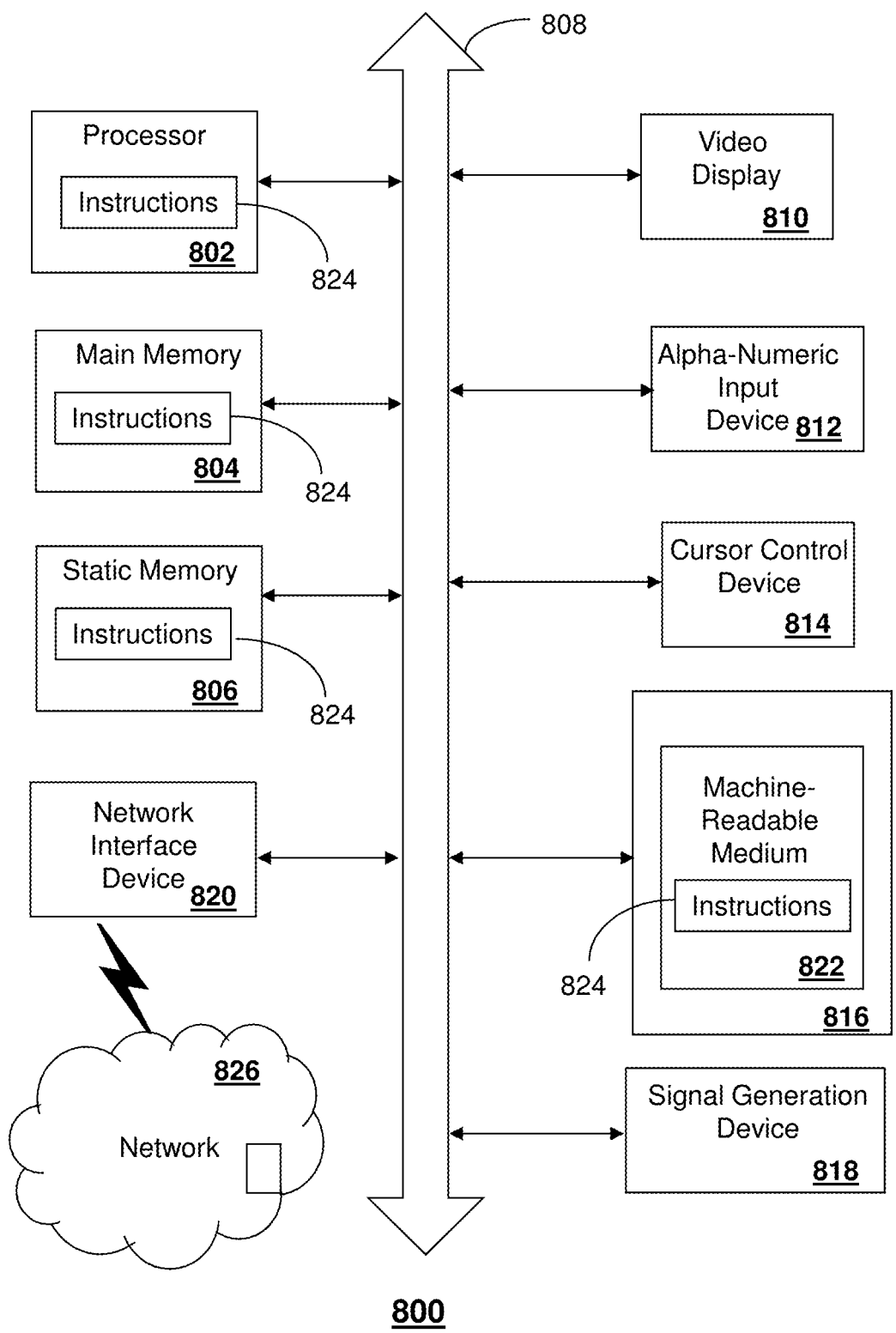
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the alternative content manager 430, media processor 406, the alternative media processor 150, the alternative media controller 110, the storage device 130 and other devices of FIGS. 1 and 3-7. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable device may perform such operations on the controllable device directly or indirectly by way of an intermediate device directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   identifying, by a processing system including a processor of a media processing device, a cue frame location within media content, the media content displayed with a first display rate;
   detecting, by the processing system, a cue frame occurring at the cue frame location and separate from frames of the media content, wherein the cue frame comprises alternative media content and an encoded message;
   obtaining, by the processing system, the alternative media content from the cue frame; and providing, by the processing system based on the encoded message, the alternative media content for display with a second display rate differing from the first display rate, the second display rate selected according to user input at the media processing device, wherein in accordance with the selected second display rate exceeding a predetermined display rate limit, the alternative media content is provided for display at a modified display rate corresponding to the display rate limit, wherein the display rate limit is determined in accordance with a type of the alternative media content.

2. The method of claim 1, wherein the media content and the alternative media content are displayed at a display device, and wherein the alternative media content is displayed according to the selected second display rate.

3. The method of claim 2, wherein the alternative media content is obtained in accordance with a comparison of the second display rate with a threshold value.

4. The method of claim 2, wherein the alternative media content is imperceptible at the display device during presentation at the first display rate.

5. The method of claim 1, wherein the media content is displayed at a first display device and the alternative media content is displayed at a second display device different from the first display device.

6. The method of claim 1, wherein the cue frame comprises a single cue frame bordered by neighboring, non-cue frames, and wherein the detecting of the cue frame is based on a difference between an image of the alternative media content of the cue frame and image data of the neighboring, non-cue frames.

7. The method of claim 1, wherein the cue frame comprises a signal identifying a location within a video frame sequence.

8. The method of claim 1, wherein the cue frame comprises a video cue frame including an image portion comprising the alternative media content.

9. The method of claim 1, further comprising generating, by the processing system, a still image comprising the alternative media content, and wherein the encoded message comprises one of a bar code or a quick response (QR) code.

10. The method of claim 9, wherein the media content comprises moving images, and wherein the one of the bar code or the QR code identifies the cue frame as a placard for display as the still image.

11. An apparatus comprising:
a processing system including a processor of a media processing device; and
a memory that stores executable instructions that, when executed by the processing system, facilitate performance of operations comprising:
identifying a cue frame location within media content, the media content displayed with a first display rate;
detecting a cue frame occurring at the cue frame location and separate from frames of the media content, the cue frame comprising a single cue frame bordered by neighboring, non-cue frames, wherein the cue frame comprises alternative media content and an encoded message;
obtaining the alternative media content from the cue frame; and
providing, based on the encoded message, the alternative media content for display with a second display rate, the second display rate differing from the first display rate, the second display rate selected according to user input at the media processing device, wherein in accordance with the selected second display rate exceeding a predetermined display rate limit, the alternative media content is provided for display at a modified display rate corresponding to the display rate limit, wherein the display rate limit is determined in accordance with a type of the alternative media content.

12. The apparatus of claim 11, wherein the alternative media content is obtained in accordance with a comparison of the second display rate with a threshold value.

13. The apparatus of claim 11, wherein the media content and the alternative media content are displayed at a display device, and wherein the alternative media content is imperceptible at the display device during presentation at the first display rate.

14. The apparatus of claim 11, wherein the detecting of the cue frame is based on a difference between an image of the alternative media content of the cue frame and image data of the neighboring, non-cue frames.

15. The apparatus of claim 11, wherein the cue frame comprises a video cue frame including an image portion comprising the alternative media content.

16. A non-transitory machine-readable medium comprising executable instructions that, when executed by a processing system including a processor of a media processing device, facilitate performance of operations comprising:
identifying a cue frame location within media content, the media content displayed with a first display rate;
detecting a cue frame occurring at the cue frame location and separate from frames of the media content, wherein the cue frame comprises alternative media content and an encoded message;
obtaining the alternative media content from the cue frame; and
providing, based on the encoded message, the alternative media content for display with a second display rate, the second display rate differing from the first display rate, the second display rate selected according to user input at the media processing device, wherein in accordance with the selected second display rate exceeding a predetermined display rate limit, the alternative media content is provided for display at a modified display rate corresponding to the display rate limit, wherein the display rate limit is determined in accordance with a type of the alternative media content.

17. The non-transitory machine-readable medium of claim 16, wherein the alternative media content is displayed according to the selected second display rate, and wherein the alternative media content is obtained in accordance with a comparison of the second display rate with a threshold value.

18. The non-transitory machine-readable medium of claim 16, wherein the media content and the alternative media content are displayed at a display device, and wherein the alternative media content is imperceptible at the display device during presentation at the first display rate.

19. The non-transitory machine-readable medium of claim 16, wherein the cue frame comprises a single cue frame bordered by neighboring, non-cue frames, and wherein the detecting of the cue frame is based on a difference between an image of the alternative media content of the cue frame and image data of the neighboring, non-cue frames.

20. The non-transitory machine-readable medium of claim 16, wherein the operations further comprise generating a still image comprising the alternative media content, wherein the encoded message comprises one of a bar code or a quick response (QR) code, and wherein the one of the bar code or the QR code identifies the cue frame as a placard for display as the still image.

* * * * *